United States Patent
Van Dalsem et al.

(10) Patent No.: US 9,776,797 B2
(45) Date of Patent: *Oct. 3, 2017

(54) HIGH EFFICIENCY CONVEYOR ASSEMBLY

(71) Applicant: Wenger Manufacturing, Inc., Sabetha, KS (US)

(72) Inventors: Scott Eugene Van Dalsem, Fairview, KS (US); Eric Rokey, Sabetha, KS (US); Dennis Howard Baumgartner, Sabetha, KS (US); Jim Painter, Sabetha, KS (US); Keith Erdley, Hiawatha, KS (US)

(73) Assignee: Wenger Manufacturing, Inc., Sabetha, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 15/496,300

(22) Filed: Apr. 25, 2017

(65) Prior Publication Data

US 2017/0225898 A1    Aug. 10, 2017

Related U.S. Application Data

(63) Continuation of application No. 15/366,796, filed on Dec. 1, 2016, which is a continuation of application
(Continued)

(51) Int. Cl.
| | |
|---|---|
| *B65G 17/16* | (2006.01) |
| *F26B 3/04* | (2006.01) |
| *F26B 17/02* | (2006.01) |
| *B65G 17/00* | (2006.01) |
| *B65G 17/06* | (2006.01) |
| *B65G 17/32* | (2006.01) |
| *F26B 15/14* | (2006.01) |
| *F26B 15/00* | (2006.01) |

(52) U.S. Cl.
CPC .......... *B65G 17/007* (2013.01); *B65G 17/067* (2013.01); *B65G 17/16* (2013.01); *B65G 17/32* (2013.01); *F26B 15/146* (2013.01); *F26B 2015/003* (2013.01)

(58) Field of Classification Search
CPC .... B65G 17/007; B65G 17/067; B65G 17/16; B65G 17/18; F26B 3/04
See application file for complete search history.

(56) References Cited

U.S. PATENT DOCUMENTS

| | | | | |
|---|---|---|---|---|
| 538,728 | A | * | 5/1895 | Davidson ............... 198/561 |
| 1,328,099 | A | * | 1/1920 | Parkes ............ B65G 17/18 |
| | | | | 198/561 |

(Continued)

*Primary Examiner* — Mark A Deuble
(74) *Attorney, Agent, or Firm* — Hovey Williams LLP

(57) ABSTRACT

Material processing apparatus (20) includes a housing (22) with a plurality of vertically stacked inverting pan conveyors (42, 44) therein. Each conveyor (42, 44) includes a plurality of conveyor pans (50) traveling between and around aligned front and rear sprocket pairs (90, 92) to define upper and lower conveyor runs (52, 54). Each pan (50) has a perforated base plate (56) presenting a pair of opposed material-supporting surfaces (58, 60). As the pans (50) traverse the sprocket pairs (90, 92), they are inverted, and material (110) carried by the upper run pans (50) is transferred to the lower run pans (50) by passage of the material around and/or between the sprocket pair (90).

28 Claims, 6 Drawing Sheets

Related U.S. Application Data

No. 15/015,214, filed on Feb. 4, 2016, now Pat. No. 9,540,175.

(56) References Cited

U.S. PATENT DOCUMENTS

| | | | | |
|---|---|---|---|---|
| 1,344,893 | A * | 6/1920 | Hofmann | F26B 15/146 198/532 |
| 1,446,308 | A * | 2/1923 | Hurxthal | B65G 17/007 198/635 |
| 1,568,791 | A * | 1/1926 | Aiken | F26B 15/146 34/208 |
| 1,768,534 | A * | 7/1930 | Aiken | B65G 17/007 198/561 |
| 2,406,279 | A * | 8/1946 | Anderson | B65G 17/067 198/494 |
| 2,428,507 | A * | 10/1947 | Webb | B65G 17/067 198/707 |
| 3,083,814 | A * | 4/1963 | Meyer | B65G 17/126 198/701 |
| 4,819,790 | A * | 4/1989 | Adcock | B65G 15/60 198/720 |
| 5,833,407 | A * | 11/1998 | Senda | G05B 19/404 318/634 |
| 8,464,862 | B2 * | 6/2013 | Honeycutt | B65G 15/08 198/822 |

* cited by examiner

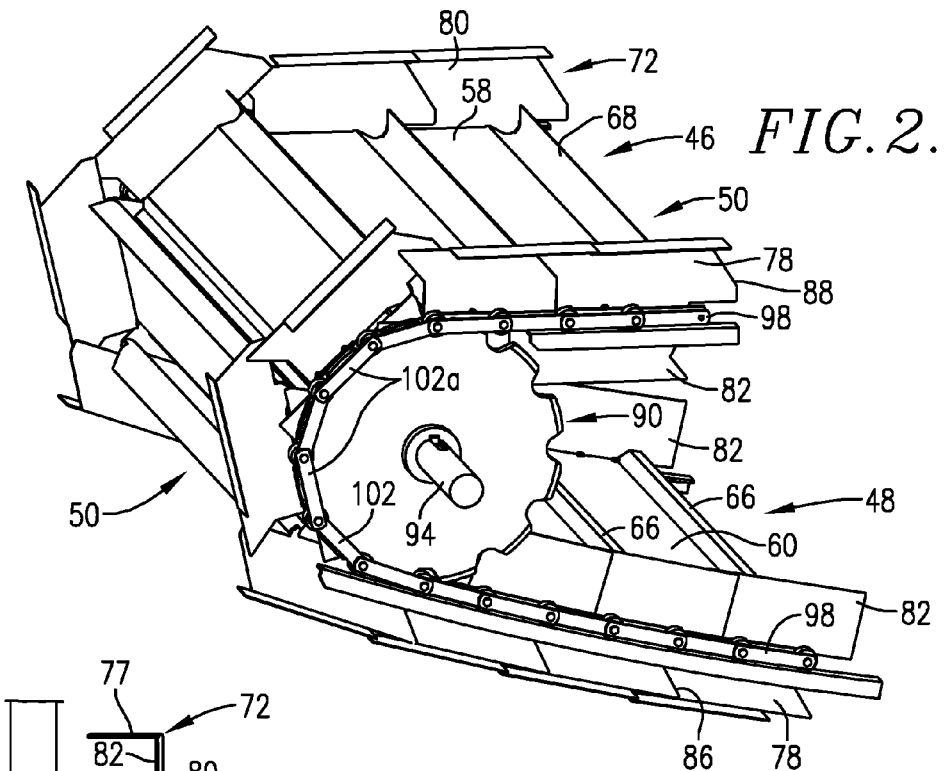
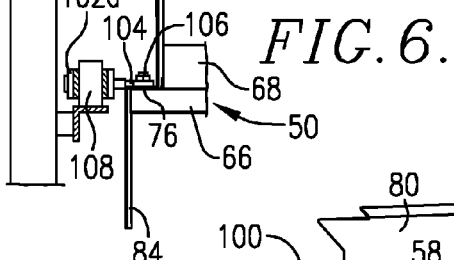
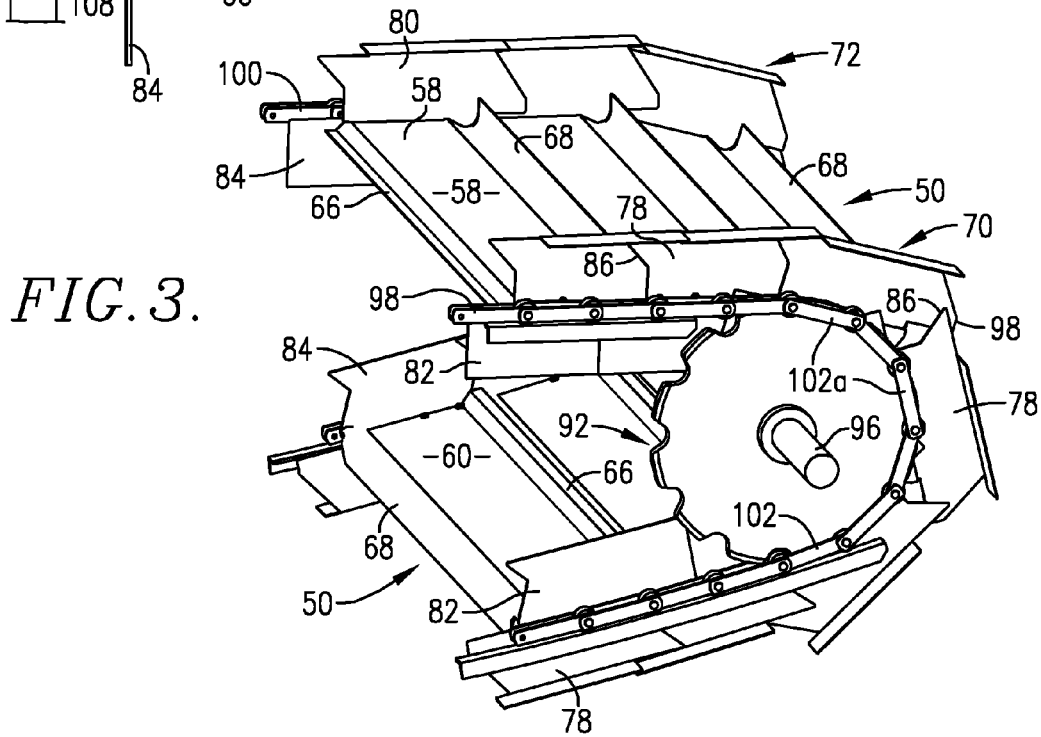

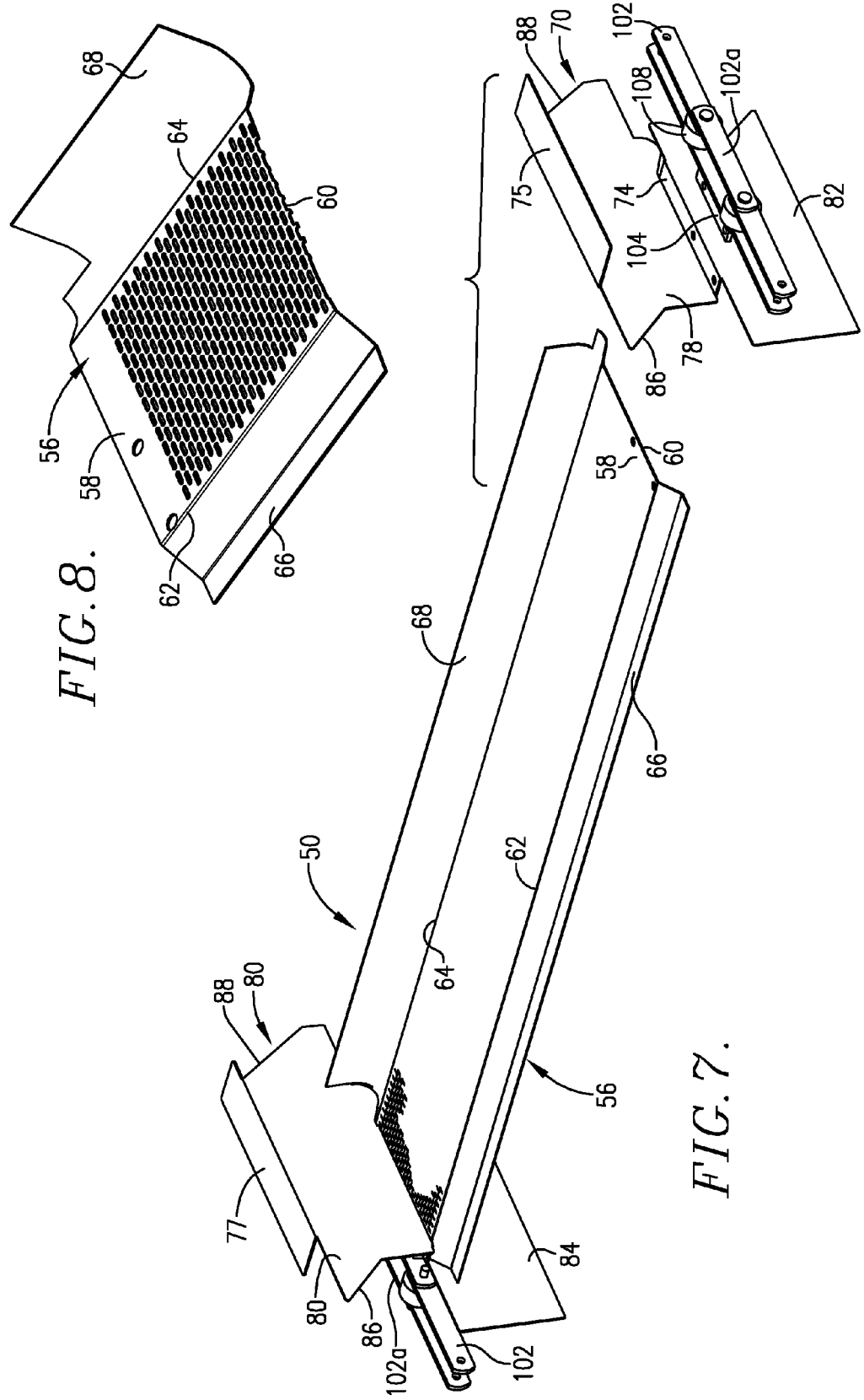

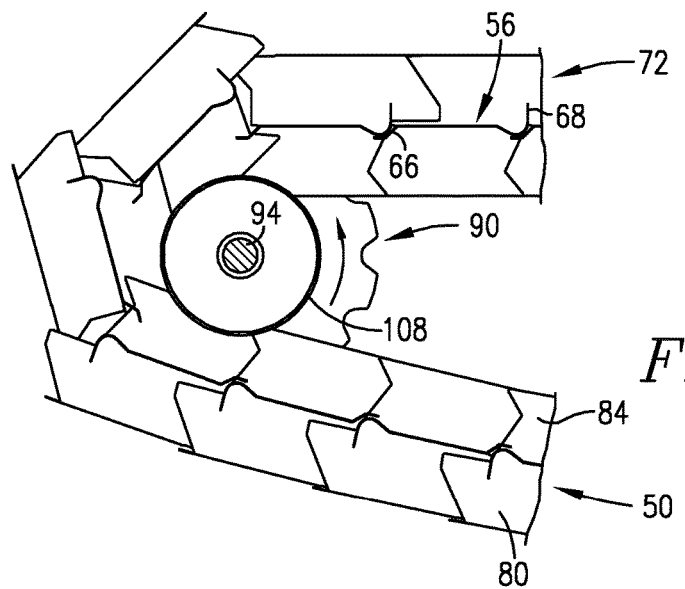
FIG. 10.
FIG. 11.
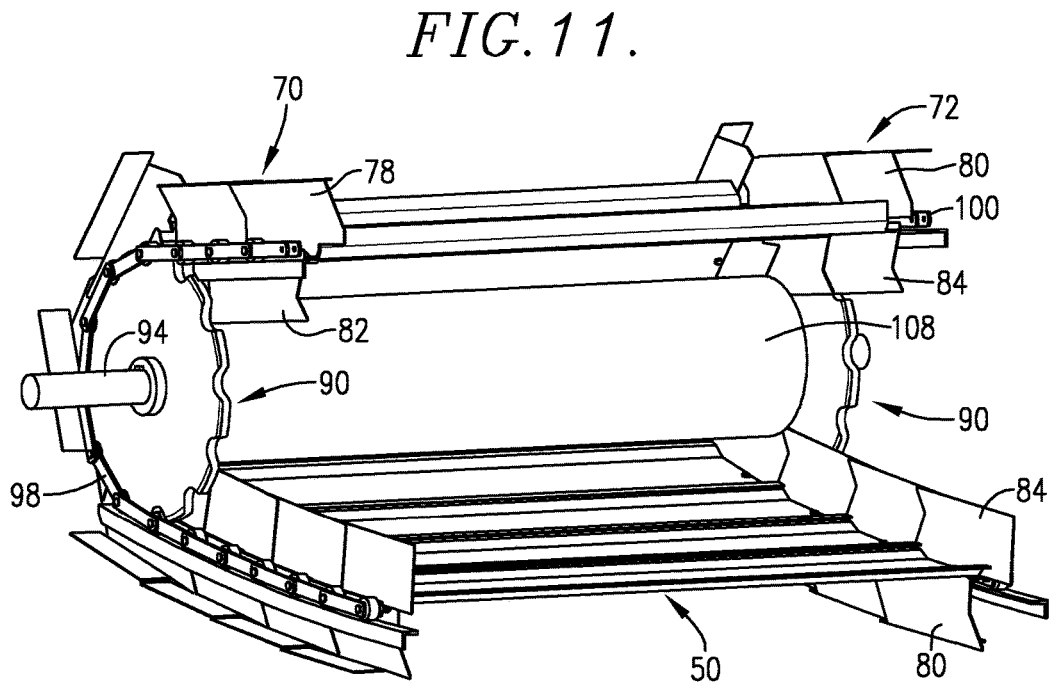

HIGH EFFICIENCY CONVEYOR ASSEMBLY

CROSS-REFERENCE TO RELATED APPLICATION

This application is a continuation of identically titled application Ser. No. 15/366,796, filed Dec. 1, 2016, which is a continuation of identically titled application Ser. No. 15/015,214, filed Feb. 4, 2016 (now U.S. Pat. No. 9,540,175, issued Jan. 10, 2017), both of which are incorporated herein by reference in their entireties.

BACKGROUND OF THE INVENTION

Field of the Invention

The present invention is broadly concerned with high efficiency material processing equipment making use of one or more inverting pan conveyors which make maximal use of both the upper and lower runs of the conveyors. More particularly, the invention is concerned with such equipment, the individual conveyors thereof, the pans forming a part of the conveyors, and corresponding methods. The apparatus and methods of the invention are particularly useful for the processing of cut extrudate materials, such as extruded feed or food products.

Description of the Prior Art

Conventional multiple-stage product dryers and coolers typically include a series of endless, stacked conveyors within a housing and oriented so that incoming material is placed on the uppermost conveyor, which then feeds the succeeding lower conveyors. Apparatus is provided for directing air into the dryer housing for drying or cooling of the material as it is conveyed along and between the conveyors. Each conveyor includes an upper run and a lower run, but, in these conventional units, only the upper runs are used for material conditioning, with the lower runs essentially being idlers. This entails a double expenditure of materials used in the construction of the equipment and excess power requirements during operation thereof.

In response to these problems, so-called inverting pan conveyors have been provided. In these units, the conveyors utilize both the upper and lower runs thereof during material processing. That is, the conveyors are designed to transfer materials from the upper to the lower runs thereof so as to increase processing efficiencies. However, in most instances, these prior inverting pan conveyors require dumping or short-circuiting of product from the upper run to the lower run at an intermediate position between the terminal sprockets supporting the conveyors, thereby sacrificing processing efficiency.

For example, U.S. Pat. Nos. 1,768,534 and 1,568,791 to Aiken describe inverting pan conveyors where product is introduced onto the conveyor pans adjacent one end of the upper run, with a cam arrangement to tilt the pans downwardly to transfer product to the lower run well before the opposite terminal sprocket is reached. Similarly, as the product traverses the lower run, it is dumped to a succeeding lower conveyor at a substantial distance from the opposite end sprockets. To a similar effect is U.S. Pat. No. 4,366,628 to George, wherein (FIG. 1) product is delivered from a chute 36 to the upper run, and is then delivered to the lower run at a substantial distance before the terminal sprocket 14 is reached. Other patents having similar design features include U.S. Pat. No. 1,328,099 to Parker, U.S. Pat. No. 538,728 to Davidson, U.S. Pat. No. 3,331,490 to Daniels, GB Patent No. 358,493 to Sutton, GB Patent No. 1,109,752 to Williams, French Patent No. FR 944,968 to Piscaglia, German reference DE 3,006,126 to Lindner, and the non-patent literature entitled "Pan Conveyors," found online at http://www.aumund.com/content/pdf/pageflip/21413457/pan_conveyors_engl_141215.pdf (Accessed Oct. 8, 2015).

U.S. Pat. No. 1,344,893 to Hofmann illustrates a conveyor design (see FIGS. 5, 7, and 8) wherein short pans move between the terminal sprockets and dump product as the pans traverse the sprockets. In this design, the individual pans are mounted so that they pivot relative to the sprockets as they go around the sprockets. This is inherently a complicated design with a complex mechanical arrangement for controlling the movements of the pans.

There is accordingly a need in the art for improved inverting pan conveyors that overcome the problems outlined above and provide a simplified, efficient conveyor arrangement which can be used in product dryers and the like.

SUMMARY OF THE INVENTION

The present invention overcomes the problems outlined above and provides improved, high efficiency invertible pan conveyors, comprising a plurality of conveyor pans that travel between and around aligned front and rear sprocket pairs to define generally horizontally extending upper and lower conveyor runs presenting upper and lower longitudinal axes, with each pan having opposed, first and second material-carrying surfaces. Structure is provided for supporting the pans so that the first surfaces face upwardly as the pans travel along the upper run, and so that the second surfaces face upwardly as the pans travel along the lower run. The pan-supporting structure is operable to orient the pans such that material carried on the first pan surfaces along the upper run is transferred to the second pan surfaces along the lower run by passage of the material between the upper and lower runs. This is accomplished while making use of substantially the entirety of the upper and lower runs for material processing purposes. To this end, as the pans traverse the upper and lower runs, they do so without pivoting of the pans relative to the upper and lower run axes; moreover, as the pans travel about the front and rear sprocket pairs, they do so without pivoting of the pans relative to the sprockets. Preferably, the conveyor pans are supported on corresponding side-mounted conveyor chains, and rigid lug connectors are used to interconnect links of the chains to the conveyor pans.

Each of the conveyor pans includes an elongated base plate having a pair of opposed, material-carrying surfaces, a pair of laterally spaced apart ends, a front margin, and a rear margin. Corresponding front and rear segments extend forwardly and rearwardly from said the front and rear margins, and the segments are of mating, concavo-convex configuration in cross-section. The pans also include laterally spaced apart end walls having upwardly and downwardly extending sections. Preferably, the pan base plates are perforate to permit air flow therethrough. The pans are fore-and-aft interconnected by mating interfits between the front and rear segments thereof.

The invention also provides multiple-stage material conditioning apparatus comprising a housing with a plurality of separate conveyors located with the housing in a stacked relationship, and including an uppermost conveyor and a lowermost conveyor. At least the uppermost conveyor is of the type described above, and, preferably, the succeeding conveyors are also of this same configuration. The housing is equipped with a material inlet for depositing material to be conditioned onto the uppermost conveyor adjacent one end thereof, together with a product outlet designed to receive conditioned material from the lowermost conveyor. Also, appropriate air-handling equipment is provided with the apparatus for delivering processing air for distribution through the conveyors.

BRIEF DESCRIPTION OF THE DRAWINGS

FIG. 2 is a fragmentary perspective view illustrating the outside forward end of the upper conveyor depicted in FIG. 1;

FIG. 3 is a fragmentary perspective view illustrating the opposite end of the upper conveyor depicted in FIG. 1;

FIG. 6 is a fragmentary sectional view illustrating a conveyor pan end wall and the connection between the pan and a conveyor chain;

FIG. 7 is an exploded perspective view of an invertible conveyor pan in accordance with the invention;

FIG. 8 is an enlarged, fragmentary view of a portion of the pan of FIG. 7, illustrating the perforated construction of the pan and base plate;

FIG. 10 is a fragmentary vertical sectional view of the upper invertible conveyor pan of FIG. 1, equipped with endmost air-blocking rollers; and FIG. 11 is a fragmentary perspective view of the inside forward end of the conveyor of FIG. 10, illustrating the air-blocking roller.

DETAILED DESCRIPTION OF THE PREFERRED EMBODIMENT

Figure 1:
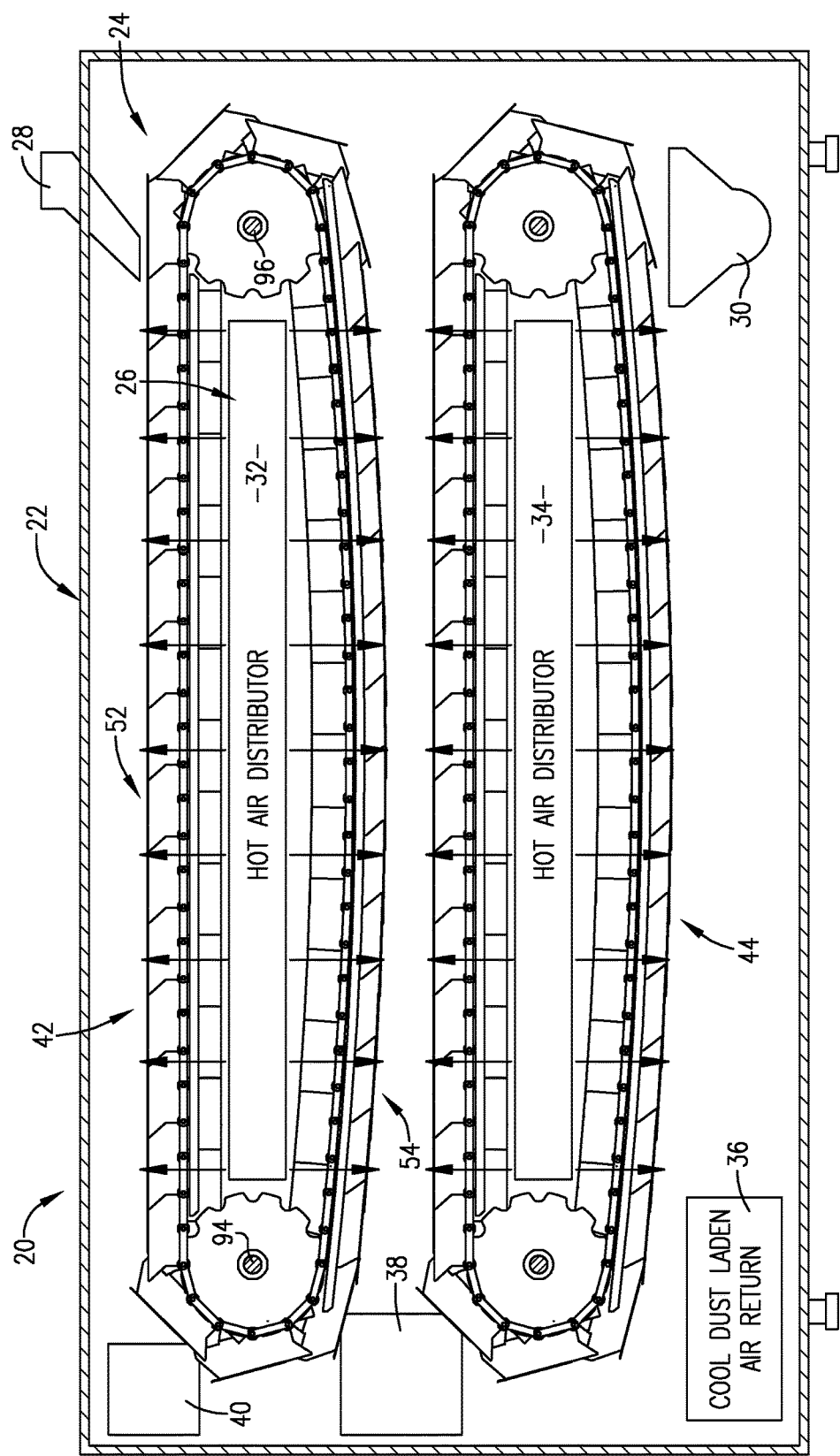
FIG. 1 is a partially schematic sectional view illustrating a two-stage material dryer, equipped with upper and lower invertible pan conveyors in accordance with the invention.
Figure 4:
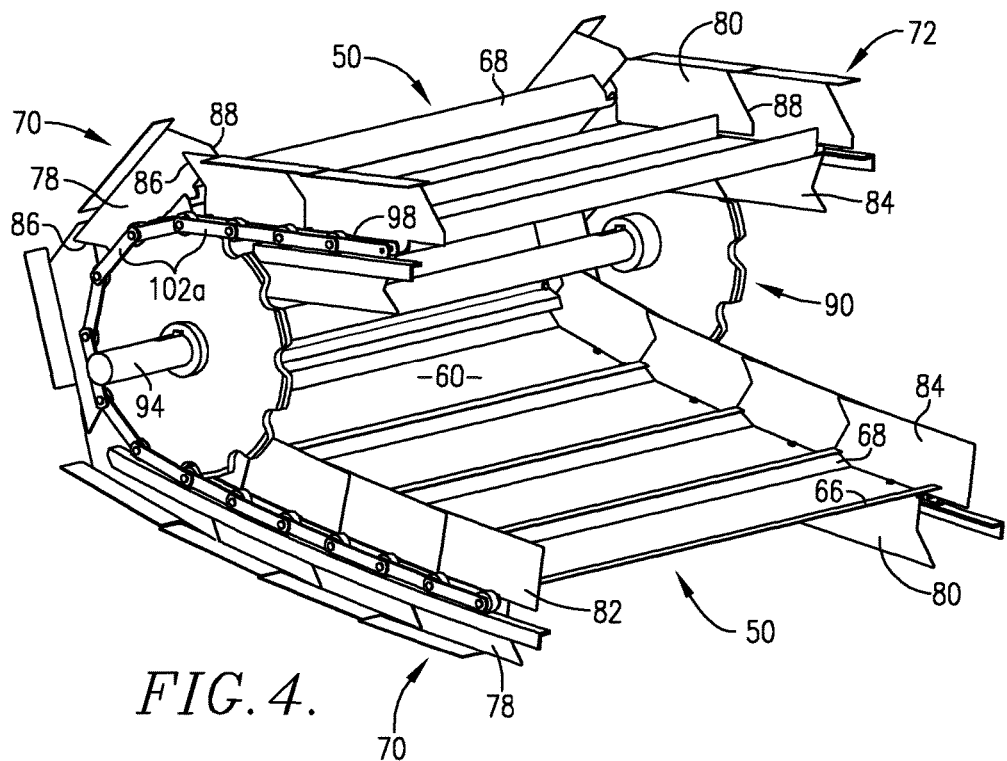
FIG. 4 is a fragmentary perspective view illustrating the inside forward end of the upper conveyor depicted in FIG. 1.
Figure 5:
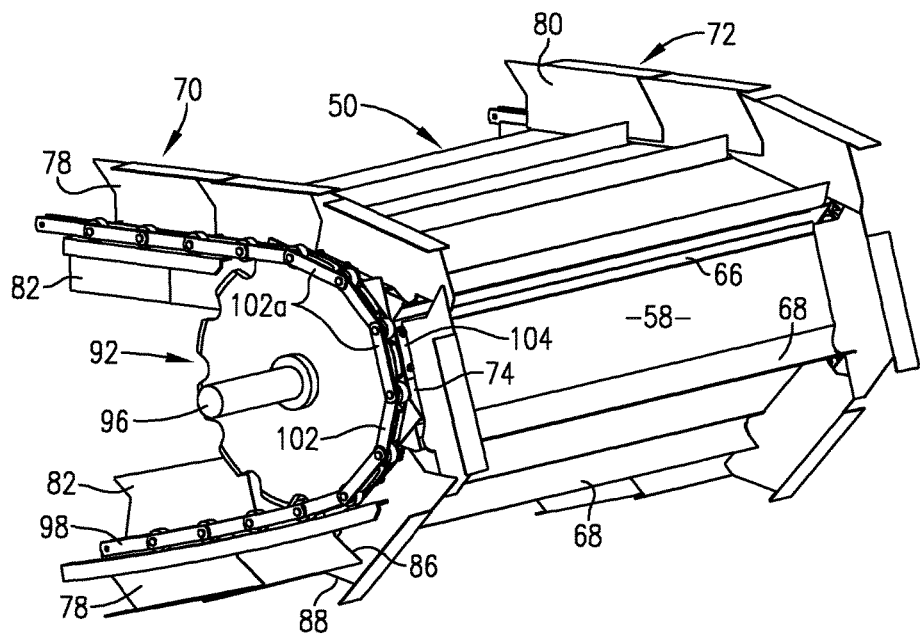
FIG. 5 is a fragmentary perspective view illustrating the opposite end of the upper conveyor depicted in FIG. 4.

Turning now to the drawings, a dryer apparatus 20 is schematically depicted in FIG. 1 and generally includes a housing 22 with an internal conveyor assembly 24, and an air-handling system 26. Housing 22 is equipped with a wet material inlet 28 oriented for directing material to be dried onto conveyor assembly 24, as well as a dried material outlet 30. The air-handling assembly 26 is itself conventional, and includes structure for delivery of hot air to internal distributors 32 and 34, as well as cool, dust-laden air returns 36-40. In operation, wet material is delivered via inlet 28 and traverses the conveyor assembly 24 while hot drying air is distributed through distributors 32, 34. Dried product from the assembly 24 is then delivered to outlet 30, while the resultant cool air passes out of the housing 22 via returns 36-40. Of course, the apparatus 20 could also be used as a product cooler, in which case cooling air would be distributed in the housing 22 in lieu of hot, drying air.

The conveyor assembly 24 includes a pair of identical upper and lower endless inverting pan conveyors 42 and 44. The upper conveyor 42 receives material to be processed adjacent the right-hand end thereof and in turn delivers partially processed material to the lower conveyor 44. The fully dried material then exits from the conveyor 44 through outlet 30. Inasmuch as the conveyors 42, 44 are identically constructed, the following discussion of conveyor 42 is equally applicable to conveyor 44.

Conveyor 42 includes a pan assembly 46 together with a powered, pan-supporting and shifting assembly 48. The pan assembly 46 made up of a series of identical pans 50 which are placed in adjacency and cooperatively define an upper conveyor run 52 and a corresponding lower conveyor run 54. Each pan 50 (see FIGS. 6-8) includes an elongated, laterally extending, substantially rectangular base plate 56 presenting opposed material-supporting surfaces 58 and 60, a front margin 62, and a rear margin 64. A concavo-convex front segment 66 extends forwardly from margin 62, whereas a mating concavo-convex rear segment 68 extends rearwardly from margin 64. As illustrated in FIGS. 7 and 8, the base plate 56 is perforated between the front and rear margins 62, 64 to permit air flow therethrough; however, these perforations are not shown in other Figures of the drawings because such would obscure the depicted structure. Moreover, the perforations may extend outwardly beyond the margins 62, 64 into the segments 66, 68, in order to maximize air flow.

The pan 50 further includes a pair of mirror image end plates 70 and 72, which respectively include an apertured central section 74, 76, an upstanding top portion 78, 80, and a depending lower portion 82, 84. The top portions 78, 80 have horizontal segments 75, 77 at their upper margins. The end plates 70 and 72 are oriented at an angle relative to the base plate 56, so that the leading edges 86 of the top portions 78, 80 are slightly outboard of the trailing edges 88 thereof. The pans 50 are arranged in conveyor 42 so that the front segment 66 of each pan 50 interfits with the rear segment 68 of the adjacent pan in one direction, and similarly the rear segment 68 of the pan interfits with the front segment 66 of the adjacent pan 50 in the other direction, so that the interfitted pans 50 cooperatively present a continuum of pans defining the upper and lower runs 52, 54. Further, the trailing ends of the segments 75, 77 of each pan 50 overlap the leading edges of the segments 75, 77 of the next trailing pan 50, in order to provide a continuous horizontal strip to restrict air flow and help keep product debris out of the chain drive described below.

The pan supporting and shifting assembly 48 includes front and rear aligned sprocket pairs 90, 92 each supported on a respective cross shaft 94, 96. First and second endless roller conveyor chains 98, 100 are trained about the sprocket pairs 90, 92, with each chain made up of a series of interconnected links 102. The shaft 94 is connected to a conventional variable speed drive (not shown) in order to rotate sprocket pair 90, thereby shifting the chains 98, 100 and also rotating the sprocket pair 92 on shaft 96.

The individual pans 50 are secured to attachment links 102a of the chains 98, 100 by means of an apertured, inwardly extending lug plate 104 attached to each link 102a. Connecting bolts 106 extend through the apertures in lug plates 104, the apertures of central sections 74, 76, and through the apertures in base plates 56, in order to interconnect the chains 98, 100 to the pan end plates 70, 72, and also to connect the end plates 70, 72 to the associated base plate 56. It will be appreciated that the connection between the chains 98, 100 and the pans 50 is non-pivoting, i.e., the pans 50 do not and cannot pivot relative to the links 102a. By the same token, as the pans 50 traverse the upper and lower runs 52, 54, there is no pivoting of the pans relative to the longitudinal axes of the runs; and, as the pans 50 travel around the sprocket pairs 90, 92, there is no pivoting of the pans relative to the sprockets.

The conveyor 42, when used as a part of apparatus 20 or the like where processing air is employed, is also preferably equipped with a pair of end rollers 108 which are respectively secured to the shafts 94, 96 to rotate therewith. As illustrated in FIGS. 10 and 11, the rollers 108 are positioned between the individual sprockets of each pair 90, 92 and extend essentially to full distance between the sprockets. The rollers 108 serve to at least partially block the flow of processing air forwardly and rearwardly from conveyor 42, thereby forcing the air upwardly and downwardly from the distributors 32, 34 and through the pans 50. Additionally, stationary, upright, air-blocking baffle plates may be provided along with or in lieu of the rollers 108 in order to further control air flow through the conveyor 42.

Operation

During operation of the conveyor 42, the sprocket pairs 90, 92 rotate and the conveyor chains 98, 100 are shifted along with the attached pans 50. Considering first the upper run 52, as the pans shift forwardly from the rear sprocket pair 92 towards forward sprocket pair 90, the material support surfaces 58 face upwardly and thus are oriented to receive and carry material 110 to be processed from inlet 28 (see FIG. 9). The material 110 is also laterally confined by the top portions 78, 80 of end plates 70, 72. As the individual pans 50 approach and begin to traverse the forward sprocket pair 92, the segment 68 and surfaces 88 disengage from the segment 66 and surfaces 86 of the adjacent rearward pan 50, creating an opening 112 between the pans. As the pans 50 continue around the forward sprocket pair 90, the pans 50 are fully inverted, so that, as they begin to traverse the lower run 54, the opposed material-supporting surfaces 60 face upwardly and the portions 82, 84 of end plates 70, 72 extend upwardly.

Figure 9:
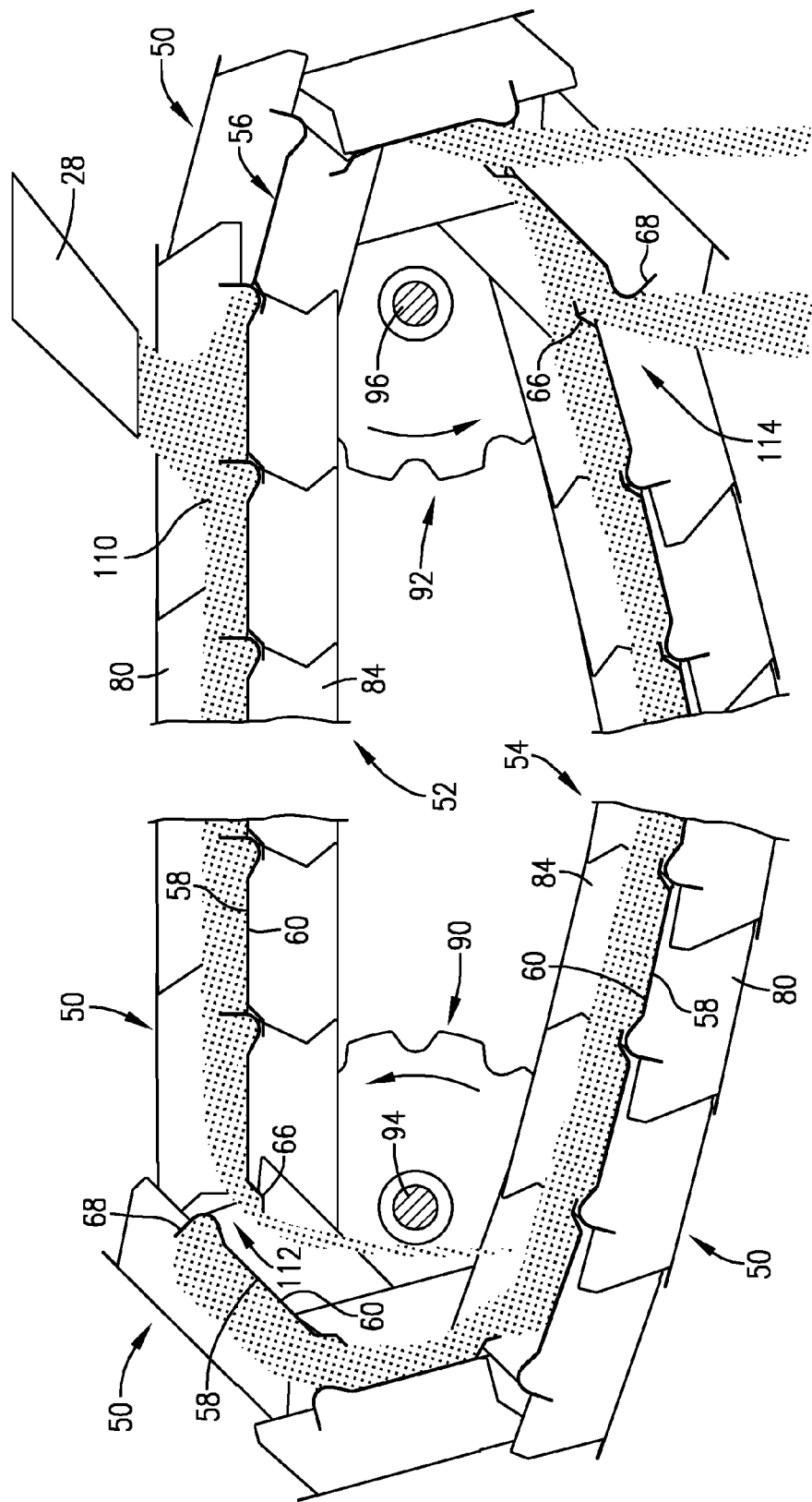
FIG. 9 is a somewhat schematic fragmentary illustration of the operation of the upper invertible conveyor pan illustrated in FIG. 1.

Importantly, the pans 50 are designed to transfer the material from the upper run pans to the lower run pans in such a way as to avoid short-circuiting of the material at an intermediate position between the front and rear sprocket pairs 90, 92. Specifically, the conveyor 42 operates to effect this material transfer by passing the material around and/or between the sprockets of sprocket pair 92. FIG. 9 illustrates an exemplary material transfer between the upper and lower runs 52, 54 where the material 110 carried in upper run 52 travels almost completely around the sprocket pair 90, and with only a very minor amount of the material passing between the individual sprockets thereof. Thus, as each pan 50 moves about the sprocket pair 90 during pan inversion, the material 110 is successively moved by force of gravity from the pan 50 to one or more of the preceding pans 50 to empty the pan, rendering it useful in its inverted position along lower run 54. Thus, the pattern of transfer of material 110 between the upper and lower runs may be entirely around the sprocket pair 90, but the invention is not so limited. In other instances, some or all of the material 110 may be passed through the region between the sprockets of pair 92 for gravitation onto the surfaces 60 of the inverted pans 50 of the lower run 54. The exact pattern of transfer of the material 110 is dependent upon a number of factors, including the speed of the chains 98, 100, the coefficient of static friction between the material 110 and the pans 50, and the angle of repose of the material 110. However, the design of the conveyor 42 is such that it can accommodate a wide range of patterns of transfer of material between the upper and lower runs 52, 54.

As the material 110 passes along lower run 54, the inverted pans 50 ultimately encounter and traverse the rear sprocket pair 92. As this occurs, there is again a separation 114 between the pans as previously described, which allows the material to gravitate toward either the input end of a another conveyor such as conveyor 44, or for that matter a conventional conveyor, or toward and into the outlet 30. Where the secondary conveyor is the identical conveyor 44, the operation thereof is exactly as described above.

Of course, where conveyor 42 is a part of apparatus 20, processing air would be directed into the distributors 32, 34 during conveyor operation. Such air serves to process the material 110 by passage through the perforated base plates of the pans 50, and then is recovered through the returns 36-40.

Conveyors in accordance with the invention permit construction of material conditioning apparatus having greatly increased efficiencies with a significantly smaller footprint. For example, a dryer as depicted in FIG. 1 could employ conveyors having a length of fifteen feet between the shafts 94, 96, which would be equivalent in capacity to a standard dryer having shaft-to-shaft distances of thirty feet. Thus, the dryers would be more economical to construct and operate.

We claim:

1. An invertible conveyor, comprising:
a plurality of conveyor pans that travel between and around aligned front and rear sprocket pairs to define generally horizontally extending upper and lower conveyor runs presenting upper and lower longitudinal axes, each pan having opposed, first and second material-carrying surfaces; and
structure supporting said pans so that said first surfaces face upwardly as the pans travel along said upper run, and so that said second surfaces face upwardly as the pans travel along said lower run,
said pan-supporting structure operable to orient the pans such that material carried on said first pan surfaces along the upper run is transferred to said second pan surfaces along said lower run by passage of the material between the upper and lower runs, said material passage occurring without pivoting of the pans relative to said upper and lower longitudinal axes as the pans travel between said front and rear sprocket pairs, and without pivoting of the pans relative to said front sprockets as the pans travel around the front sprockets,
each of said pans having a base plate presenting front and rear marginal portions, the front and rear marginal portions of the pans being in close adjacency during travel of the pans along said upper and lower runs, the front and rear marginal portions of adjacent pans separating from each other as the adjacent pans travel around said sprockets to create openings for said passage of said material between said upper and lower runs.

2. The conveyor of claim 1, said pan-support structure serving to transfer said material between said upper and lower runs by passing the material around said front sprockets.

3. The conveyor of claim 1, said pan-supporting structure comprising:
first and second endless conveyor chains respectively trained about aligned front and rear sprockets and having a series of chain links; and
connectors fixedly securing each pan to corresponding chain links of the conveyor chains.

4. The conveyor of claim 1, said front and rear segments being of concavo-convex configuration in cross-section.

5. The conveyor of claim 4, including end plates secured to each lateral end of said base plate, said end plates extending above and below the base plate, the end plates of each pan configured to abut the end plates of the next adjacent pans.

6. The conveyor of claim 1, said pan-supporting structure operable to orient the pans as they travel around said rear sprockets such that material carried on said second pan surfaces along said lower run is transferred from the conveyor.

7. The conveyor of claim 1, at least a portion of said pans being perforate to permit air flow therethrough.

8. The conveyor of claim 7, including structure for passing air through said perforate portions of said pans.

9. The conveyor of claim 1, including air-blocking elements between said front and rear sprocket pairs and configured to inhibit air flow from between said upper and lower runs outwardly between the front and rear sprocket pairs.

10. The conveyor of claim 9, there being respective cross shafts extending between and supporting said front and rear sprocket pairs, said air blocking elements comprising tubular bodies secured to said cross shafts.

11. The conveyor of claim 1, said front and rear marginal portions of the pans being in lapped relationship during travel of the pans along said upper and lower runs.

12. Multiple-stage material processing apparatus, comprising:
    a housing; and
    a plurality of separate conveyors located within said housing in a stacked relationship, including an uppermost conveyor and a lowermost conveyor,
    said uppermost conveyor comprising—
        a plurality of conveyor pans that travel between and around aligned front and rear sprocket pairs to define generally horizontally extending upper and lower conveyor runs presenting upper and lower longitudinal axes, each pan having opposed, first and second material-carrying surfaces; and
        structure supporting said pans so that said first surfaces face upwardly as the pans travel along said upper run, and so that said second surfaces face upwardly as the pans travel along said lower run,
        said pan-supporting structure operable to orient the pans such that material carried on said first pan surfaces along the upper run is transferred to said second pan surfaces along said lower run by passage of the material between the upper and lower runs, said material passage occurring without pivoting of the pans relative to said upper and lower longitudinal axes as the pans travel between said front and rear sprocket pairs, and without pivoting of the pans relative to said front sprockets as the pans travel around the front sprockets,
        said pan-supporting structure also operable to orient the pans as they travel around said rear sprockets such that material carried on said second pan surfaces along said lower run is transferred from the uppermost conveyor to the next adjacent conveyor of said plurality of conveyors,
        each of said pans having a base plate presenting front and rear marginal portions, the front and rear marginal portions of the pans being in close adjacency during travel of the pans along said upper and lower runs, the front and rear marginal portions of adjacent pans separating from each other as the adjacent pans travel around said sprockets to create openings for said passage of said material between said upper and lower runs; and
        apparatus operable to distribute processing air within said housing to dry said material.

13. The apparatus of claim 12, each of said conveyors between said uppermost and lowermost conveyors comprising:
    a plurality of conveyor pans that travel between and around aligned front and rear sprocket pairs to define generally horizontally extending upper and lower conveyor runs presenting upper and lower longitudinal axes, each pan having opposed, first and second material-carrying surfaces; and
    structure supporting said pans so that said first surfaces face upwardly as the pans travel along said upper run, and so that said second surfaces face upwardly as the pans travel along said lower run,
    said pan-supporting structure operable to orient the pans such that material carried on said first pan surfaces along the upper run is transferred to said second pan surfaces along said lower run by passage of the material between the upper and lower runs, said material passage occurring without pivoting of the pans relative to said upper and lower longitudinal axes as the pans travel between said front and rear sprocket pairs, and without pivoting of the pans relative to said front sprockets as the pans travel around the front sprockets,
    said pan-supporting structure also operable to orient the pans as they travel around said rear sprockets such that material carried on said second pan surfaces along said lower run is transferred from the each conveyor to the next adjacent conveyor.

14. The apparatus of claim 12, said lowermost conveyor comprising:
    a plurality of conveyor pans that travel between and around aligned front and rear sprocket pairs to define generally horizontally extending upper and lower conveyor runs presenting upper and lower longitudinal axes, each pan having opposed, first and second material-carrying surfaces; and
    structure supporting said pans so that said first surfaces face upwardly as the pans travel along said upper run, and so that said second surfaces face upwardly as the pans travel along said lower run,
    said pan-supporting structure operable to orient the pans such that material carried on said first pan surfaces along the upper run is transferred to said second pan surfaces along said lower run by passage of the material between the upper and lower runs, said material passage occurring without pivoting of the pans relative to said upper and lower longitudinal axes as the pans travel between said front and rear sprocket pairs, and without pivoting of the pans relative to said front sprockets as the pans travel around the front sprockets,
    said pan-supporting structure also operable to orient the pans as they travel around said rear sprockets such that material carried on said second pan surfaces along said lower run is transferred from the lowermost conveyor to a dried product outlet.

15. The apparatus of claim 12, said pan-support structure serving to transfer said material between said upper and lower runs by passing the material between said front sprockets.

16. The apparatus of claim 12, said pan-supporting structure comprising:
    first and second endless conveyor chains respectively trained about aligned front and rear sprockets and having a series of chain links; and connectors fixedly securing each pan to corresponding chain links of the conveyor chains.

17. The apparatus of claim 12, said front and rear segments being of concavo-convex configuration in cross-section.

18. The apparatus of claim 12, including end plates secured to each lateral end of said base plate, said end plates extending above and below the base plate, the end plates of each pan configured to abut the end plates of the next adjacent pans.

19. The apparatus of claim 12, said pan-supporting structure operable to orient the pans as they travel around said rear sprockets such that material carried on said second pan surfaces along said lower run is transferred from the conveyor.

20. The apparatus of claim 12, at least a portion of said pans being perforate to permit air flow therethrough.

21. The conveyor of claim 12, including air-blocking elements between said front and rear sprocket pairs of said uppermost conveyor and configured to inhibit air flow from between said upper and lower runs outwardly between the front and rear sprocket pairs.

22. The conveyor of claim 21, there being respective cross shafts extending between and supporting said front and rear sprocket pairs, said air blocking elements comprising tubular bodies secured to said cross shafts.

23. The conveyor of claim 12, said front and rear marginal portions of the pans being in lapped relationship during travel of the pans along said upper and lower runs.

24. An invertible conveyor pan, comprising:
an elongated, substantially flat base plate having a pair of opposed, material-carrying surfaces, a pair of laterally spaced apart ends, a front margin, a rear margin, and an axial length between said front and rear margins;
a front segment extending forwardly from said front margin;
a rear segment extending rearwardly from said rear margin,
said front and rear segments each having an axial length less than the axial length of said base plate,
said front and rear segments each being of mating, concavo-convex configuration in cross-section; and
an end wall adjacent each of said ends, each end wall having an upper section extending above the base plate and a lower section extending below the base plate, said end plates having fore-and-aft edge surfaces.

25. The pan of claim 24, said base plate being perforate to permit air flow therethrough.

26. An invertible conveyor, comprising:
a plurality of conveyor pans that travel between and around aligned front and rear sprocket pairs to define generally horizontally extending upper and lower conveyor runs presenting upper and lower longitudinal axes, each pan having opposed, first and second material-carrying surfaces; and
structure supporting said pans so that said first surfaces face upwardly as the pans travel along said upper run, and so that said second surfaces face upwardly as the pans travel along said lower run,
said pan-supporting structure operable to orient the pans such that material carried on said first pan surfaces along the upper run is transferred to said second pan surfaces along said lower run by passage of the material between the upper and lower runs,
each of said pans having a base plate presenting front and rear marginal portions, the front and rear marginal portions of the pans being in close adjacency during travel of the pans along said upper and lower runs, the front and rear marginal portions of adjacent pans separating from each other as the adjacent pans travel around said sprockets to create openings for said passage of said material between said upper and lower runs.

27. The conveyor of claim 26, said pan-supporting structure operable to orient said pan so that said material passage occurs without pivoting of the pans relative to said upper and lower longitudinal axes as the pans travel between said front and rear sprocket pairs, and without pivoting of the pans relative to said front sprocket as the pans travel about the front sprocket.

28. The conveyor of claim 26, said front and rear marginal portions of the pans being in lapped relationship during travel of the pans along said upper and lower runs.

* * * * *